(12) United States Patent
Below et al.

(10) Patent No.: US 9,715,838 B2
(45) Date of Patent: Jul. 25, 2017

(54) POSITIONING TABLE ASSEMBLY FOR CRASH TEST DUMMY

(71) Applicant: Humanetics Innovative Solutions, Inc., Plymouth, MI (US)

(72) Inventors: John Below, Marblehead, OH (US); Dennis Moeller, Maumee, OH (US); Paul Depinet, Norwalk, OH (US)

(73) Assignee: HUMANETICS INNOVATIVE SOLUTIONS, INC., Plymouth, MI (US)

(*) Notice: Subject to any disclaimer, the term of this patent is extended or adjusted under 35 U.S.C. 154(b) by 92 days.

(21) Appl. No.: 14/803,605

(22) Filed: Jul. 20, 2015

(65) Prior Publication Data

US 2016/0027343 A1    Jan. 28, 2016

Related U.S. Application Data

(60) Provisional application No. 62/027,304, filed on Jul. 22, 2014.

(51) Int. Cl.
*B23Q 3/18* (2006.01)
*G09B 23/30* (2006.01)
*G09B 23/32* (2006.01)

(52) U.S. Cl.
CPC ............ *G09B 23/30* (2013.01); *G09B 23/32* (2013.01)

(58) Field of Classification Search
USPC .................. 269/21, 58, 71, 73, 285
See application file for complete search history.

(56) References Cited

U.S. PATENT DOCUMENTS

| 2,188,053 | A | * | 1/1940 | Madsen | B25B 5/142 227/152 |
|---|---|---|---|---|---|
| 5,031,547 | A | * | 7/1991 | Hirose | B23Q 1/4866 108/137 |
| 5,836,080 | A | * | 11/1998 | Inagaki | B23Q 3/18 108/140 |
| 6,622,586 | B2 | * | 9/2003 | Scheidegger | B23Q 1/5487 74/490.07 |
| 8,823,477 | B2 | * | 9/2014 | Malanczyj | H01F 7/04 269/8 |
| 2011/0144955 | A1 | | 6/2011 | Cooper et al. | |

FOREIGN PATENT DOCUMENTS

DE    102013009815 A1    12/2013
EP    1519345 A2    3/2005
FR    2966966 A1    5/2012

OTHER PUBLICATIONS

European Search Report for Application Serial No. EP 15 17 7701 dated Nov. 16, 2015.
European Search Report dated Nov. 16, 2015 for European Application No. EP 15177701.

* cited by examiner

*Primary Examiner* — Joseph J Hail
*Assistant Examiner* — Shantese McDonald
(74) *Attorney, Agent, or Firm* — Howard & Howard Attorneys PLLC

(57) ABSTRACT

A positioning table assembly for a crash test dummy includes a table bed adapted to be attached to an impact table for the crash test dummy and a table top adapted to support the crash test dummy and movably attached to the table bed for independent movement in X and Y axes and rotationally about a Z axis to position the crash test dummy relative to the table bed.

18 Claims, 8 Drawing Sheets

POSITIONING TABLE ASSEMBLY FOR CRASH TEST DUMMY

CROSS-REFERENCE TO RELATED APPLICATION(S)

The present application claims the benefit of Provisional Patent Application, Ser. No. 62/027,304, filed Jul. 22, 2014.

BACKGROUND OF THE INVENTION

1. Field of the Invention

The present invention relates generally to crash test dummies and, more particularly, to a positioning table assembly for a crash test dummy.

2. Description of the Related Art

Automotive, aviation, and other vehicle manufacturers conduct a wide variety of collision testing to measure the effects of a collision on a vehicle and its occupants. Through collision testing, a vehicle manufacturer gains valuable information that can be used to improve the vehicle, authorities examine vehicles to summit type approval, and consumer organizations provide information on vehicle safety ratings to the public.

Collision testing often involves the use of anthropomorphic test devices, better known as "crash test dummies", to estimate a human's injury risk. The dummy must possess the general mechanical properties, dimensions, masses, joints, and joint stiffness of the humans of interest. In addition, they must possess sufficient mechanical impact response similitude and sensitivity to cause them to interact with the vehicle's interior in a human-like manner.

The crash test dummy typically includes a head assembly, spine assembly (including neck), rib cage assembly, abdomen, pelvis assembly, right and left arm assemblies, and right and left leg assemblies. Generally, the arm assembly has an upper arm assembly and a lower arm assembly. The upper arm assembly is typically connected to a shoulder assembly, which, in turn, is typically connected to the spine assembly.

Thorax impact tests on the crash test dummy have shown to be sensitive to impact location. This means for every small misalignment of an impact point on the crash test dummy, a different set of test results is created. When moving the crash test dummy into the last setup position, the dummy would generally loose the setup criteria. Thus, there is a need in the art for a positioning table that will allow a user to move the crash test dummy freely in the X-Y direction in small increments without loosing setup criteria. This includes linearly in the X and Y axes and rotationally about the Z axis.

SUMMARY OF THE INVENTION

Accordingly, the present invention is a positioning table assembly for a crash test dummy. The positioning table assembly includes a table bed adapted to be attached to an impact bed for a crash test dummy. The positioning table assembly also includes a table top adapted to support the crash test dummy and movably attached to the table bed for independent movement in X and Y axes and rotationally about a Z axis to position the crash test dummy relative to the table bed.

One advantage of the present invention is that a new positioning table assembly is provided for a crash test dummy. Another advantage of the present invention is that the positioning table assembly allows the user to move the crash test dummy in the X-Y direction for small increments without loosing setup criteria. An additional advantage of the present invention is that the positioning table assembly allows the user to rotate the crash test dummy about the Z axis for unlimited angular movements. Yet another advantage of the present invention is that the positioning table assembly includes a table top that sits on a number of low friction bearings to allow ease of movement. Still another advantage of the present invention is that the positioning table assembly includes a bearing plate with high strength magnets incorporated to quickly "lock down" the table top when the crash test dummy is in the impact position. A further advantage of the present invention is that the positioning table assembly allows more precise positioning of a crash test dummy in the "X" and "Y" axes for certification.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
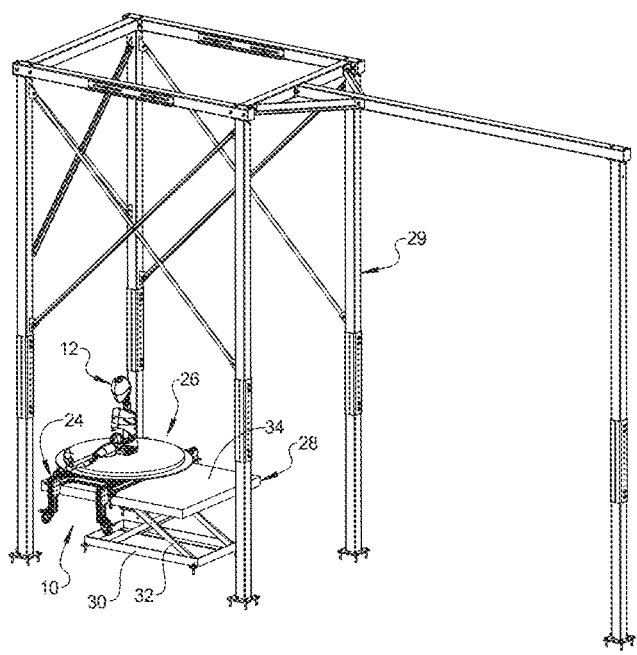
FIG. 1 is a perspective view of one embodiment of a positioning table assembly, according to the present invention, for a crash test dummy.
Figure 2:
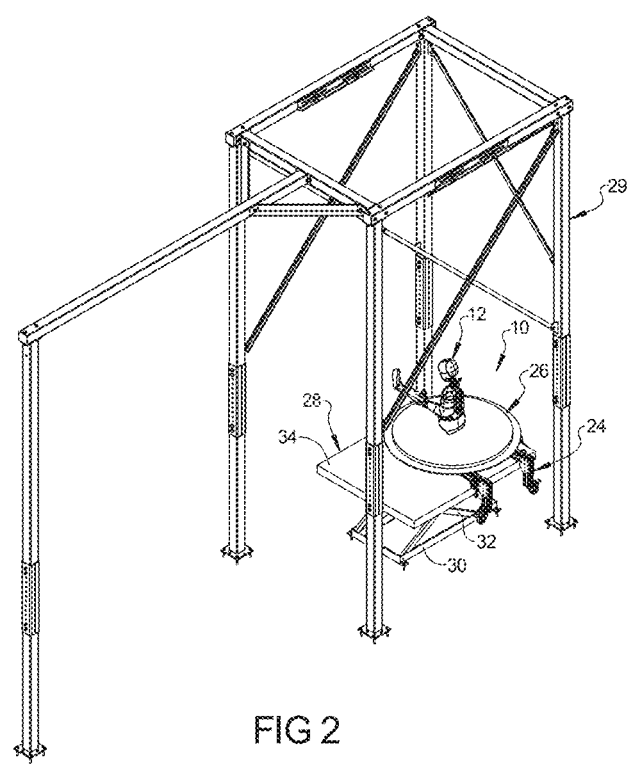
FIG. 2 is another perspective view of the positioning table assembly of FIG. 1.

Referring to the drawings and in particular FIGS. 1 and 2, one embodiment of a positioning table assembly, according to the present invention, is shown at 10 for a crash test dummy, generally indicated at 12. In the embodiment illustrated, the crash test dummy 12 is of a 10.5 year old child and is illustrated in a sitting position on the positioning table assembly 12. This crash test dummy 12 is used primarily to test the performance of automotive interiors and restraint systems for front and rear seat occupants. The size and weight of the crash test dummy 12 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data.

Figure 3:
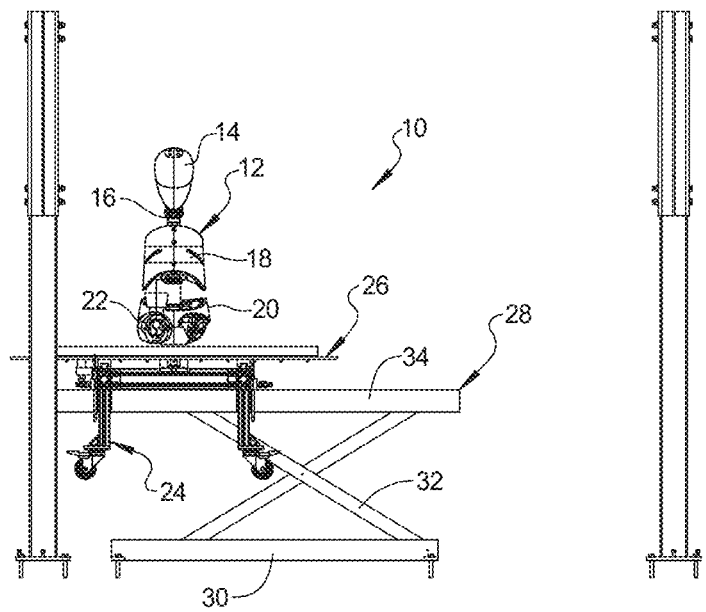
FIG. 3 is a front elevational view of the positioning table assembly of FIGS. 1 and 2.
Figure 4:
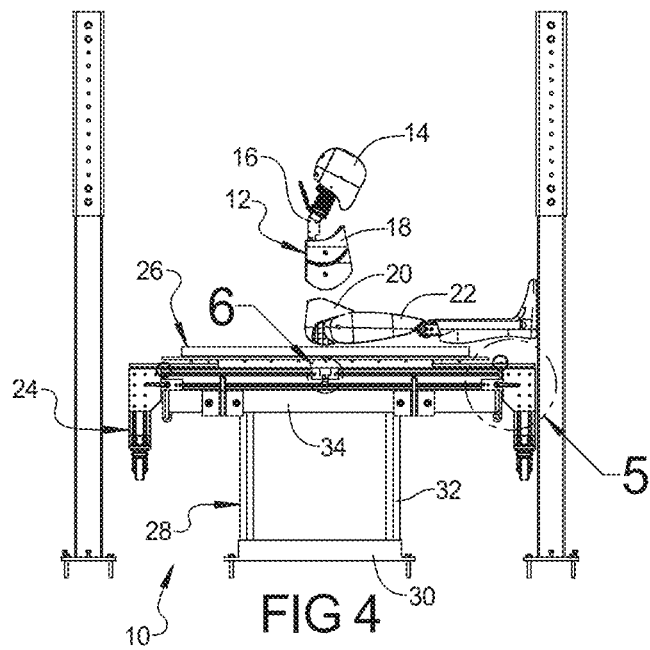
FIG. 4 is a side elevational view of the positioning table assembly of FIGS. 1 and 2.

As illustrated in FIGS. 3 and 4, the crash test dummy 12 generally includes a head assembly 14, a spine assembly 16 having an upper end mounted to the head assembly 14 and a lower end extending into a torso area of the crash test dummy 12. The torso area of the crash test dummy 12 also includes a rib cage assembly 18 connected to the spine assembly 16 and a pair of arm assemblies (not shown) for a right arm assembly and a left arm assembly. The crash test dummy 12 includes a pelvis assembly 20 and a pair of leg assemblies (only one shown) connected to the pelvis assembly 20 for a right leg assembly 22 and a left leg assembly (not shown). It should be appreciated that various components of the crash test dummy 12 may be covered in a polyvinyl skin such as a flesh and skin assembly (not shown) for biofidelity of the crash test dummy 12.

Referring to FIGS. 1 through 4, the positioning table assembly 10 includes a table bed, generally indicated at 24, and a table top, generally indicated at 26, to support the crash test dummy 12. The table bed 24 can be moved relative to an impact table, generally indicated at 28, disposed within an impact stand, generally indicated at 29. The impact table 28 includes a frame 30 that is supported by a support surface such as a floor, a movable lift linkage 32 having a lower end connected to the frame 30, and a table 34 connected to an upper end of the lift linkage 32. The table 34 supports the positioning table assembly 10 during impact testing of the crash test dummy 12. The impact table 28 may be raised or lowered to raise or lower the positioning table assembly 10. It should be appreciated that the lift linkage 32 allows the table 34 to be raised and lowered relative to the frame 30. It should be appreciated that the impact table 28 and impact stand 29 are conventional and known in the art.

Referring to FIGS. 4 through 9, the table bed 24 includes a frame 35 to be attached to and detached from the impact table 28. The frame 35 include a pair of side members 36 extending longitudinally and spaced laterally and a pair of cross-members 38 extending laterally and spaced longitudinally. The cross-members 38 are disposed between the side members 36 and connected to each other by a suitable mechanism such as a plurality of inside gusset corner brackets 39, which are, in turn, joined to the side members 36 and cross-members 38 by a suitable mechanism such as welding, fasteners, etc. The side members 36 and cross-members 38 form a general "H" shape. The frame 35 also includes a plurality of leg members 40 extending vertically from ends of the side members 36. The leg members 40 are connected to the side members 36 by a suitable mechanism such as a plurality of joining plates 42, which are, in turn, joined to the side members 36 and leg members 40 by a suitable mechanism such as welding, fasteners, etc. The cross-members 38 may include a notch 43 extending therein for a function to be described. The members 36, 38, and 40 are made of a metal material such as aluminum.

The table bed 24 also includes a plurality of casters 44 connected to the frame 35 to allow the frame 35 to move on the support surface and relative to the impact table 28. The casters 44 are of a swivel and lock caster type. One caster 44 is connected to the bottom of one of the leg members 40. The caster 44 includes a bracket 46 connected to the leg member 40 by a suitable mechanism such as fasteners and a roller 48 rotatably connected to the bracket 46. It should be appreciated that the casters 44 are conventional to allow rolling movement along a support surface.

The table bed 24 further includes a pair of rails 50 to allow for gross "Y" axis location setup. The rails 50 are linear and extend longitudinally and are spaced laterally. One rail 50 is disposed on top of one of the side members 36 and connected thereto by a suitable mechanism such as welding, fasteners, etc. The table bed 24 also includes a plurality of bearing carriages 52 movably cooperating with the rails 50. The bearing carriages 52 are of a linear ball bearing type. The bearing carriages 52 are spaced longitudinally along the rails 50 and are movable along the rails 50.

Figure 5:
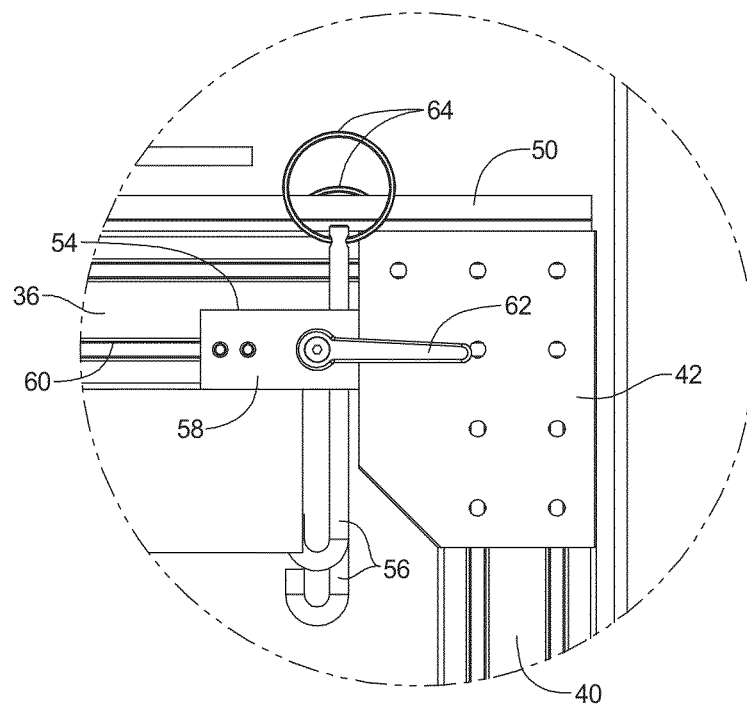
FIG. 5 is an enlarged view of a portion of the positioning table assembly of FIG. 4.

The positioning table assembly 10 includes one or more clamp assemblies 54 to attach the table bed 24 to the impact table 28. The clamp assembly 54 includes a hook member 56 and a bracket 58 attached to the hook member 56. The hook member 56 is of a "j" hook type. The bracket 58 slides in a track 60 extending longitudinally along the side member 36. The clamp assembly 54 also includes a locking handle 60 attached to the bracket 58 to lock the bracket 58 in place along the track 60. The clamp assembly 54 further includes a pull handle 64 attached to one end of the hook member 56. The pull handle 64 is of a split ring type. The operator slides the clamp assembly 54 in the track 60 until the hook portion of the hook member 56 is under a lip of the impact table 28, pulls up on the pull handle 64, and tightens the locking handle 60 as illustrated in FIG. 5. It should be appreciated that the clamp assemblies 54 are adjustable for impact tables 28 of different widths.

Referring to FIGS. 10 through 13, the positioning table assembly 10 also includes the table top 26, which is disposed on top of the table bed 24 to support the crash test dummy 12. The table top 26 includes a top plate 66 that is generally circular in shape, but may be any suitable shape. The table top 26 also includes a bearing plate 68 that is generally circular in shape, but may be any suitable shape. The bearing plate 68 has a diameter greater than a diameter of the top plate 66. The top plate 66 includes a welded edge or lip 70 about the circumference thereof to form a cavity 72. The lip 70 acts as a travel stop to limit the movement and a pinch guard to remove "pinch points" between the top plate 66 and bearing plate 68. The bearing plate 68 is attached to the bearing carriages 52 by a suitable mechanism such as fasteners. It should be appreciated that a pinch gap exists between the lip 70 and the bearing plate 68. It should also be appreciated that the bearing plate 68 has allowances to be attached to conventional impact tables 28.

The table top 26 further includes a plurality of ball transfers 74 attached to the bearing plate 68 to allow for movement of the top plate 66 linearly in the X and Y axes as well as rotationally about the Z axis. The ball transfers 74 are of a ball bearing roller guide type. The ball transfers 74 are spaced radially and diagonally along the bearing plate 68. The top plate 66 sits on top of the ball transfers 74 such that the ball transfers 74 are disposed in the cavity 72 of the top plate 66. It should be appreciated that the top plate 66 slides or shifts on the ball transfers 74 and the ball transfers 74 may be added or subtracted to change allowable shift position. It should also be appreciated that the table top 66 has a predetermined distance of movement in the X and Y axes. It should further be appreciated that the crash test dummy 12 is seated on top of the top plate 66.

The table top 26 also includes one or more permanent electromagnets 76 to hold the top plate 66 in place relative to the bearing plate 68. The table top 26 includes one or more solenoids 78 to move the electromagnets 76 relative to the bearing plate 68. The solenoids 78 are of a linear pull type solenoid and connected to a source of power (not shown). The table top 26 further includes a plurality of magnet holders 80 to hold the electromagnets 76 and a plurality of magnet holder guide rods 82 connected to the solenoids 78 to guide the movement of the magnet holders 80. The table top 26 includes one or more springs 84 disposed between the magnet holder 80 and the electromagnet 76. The spring 84 is of a conical compression type. The bearing plate 68 has one or more apertures 86 extending therethrough to allow the electromagnets 76 and solenoids 78 to extend therethrough. In the embodiment illustrated, the bearing plate 68 has three apertures 86 spaced radially along a diameter thereof for the three electromagnets 76 and solenoids 78, which extend through the apertures 86. It should be appreciated that the solenoids 78 are attached to the bearing plate 68 by a suitable mechanism such as fasteners. It should be appreciated that the solenoids 78 allow the magnets to travel a predetermined distance away from the top plate 66 during movement. It should further be appreciated that the notches 43 in the cross-members 38 allow for clearance of the solenoids 78 when the table top 26 is moved relative to the table bed 24.

The positioning table assembly 10 includes an internally powered external trigger switch (not shown) to initiate the "ON" time of the solenoids 78. In one embodiment, the trigger switch is a relay. The positioning table assembly 10 may include an adjustable delay relay (not shown) to limit the magnet electricity "ON" time. The delay relay turns the electromagnet 76 "OFF" for the desired time interval. The delay relay will only reset when the trigger switch resets after the time delay interval has ended, at which time, can be repeated. The solenoids 78 will retract the electromagnets 76 away from the top plate 66 to minimize the holding force and allow the electromagnets 76 to drop out of the way when the crash test dummy 12 is being positioned to maintain the free movement of the top plate 66 such that the top plate 66 moves or shifts relative to the bearing plate 68. It should be appreciated that when electricity is ON or supplied to each solenoid 78, the electromagnet 76 is OFF or disengaged with the top plate 66. It should also be appreciated that the electromagnets 78 will hold the top plate 66 securely when not ON or engaged. It should further be appreciated that the trigger switch and solenoids may be controlled by a foot switch (not shown) and when the foot switch is depressed, the top plate 66 is free to move and rotate in the X-Y direction and rotate about the Z axis. It should still further be appreciated that the springs 84 are placed under the electromagnets 76 and the retracted electromagnets 76 are returned to the top plate 66 for braking force when the foot switch is released.

Figure 6:
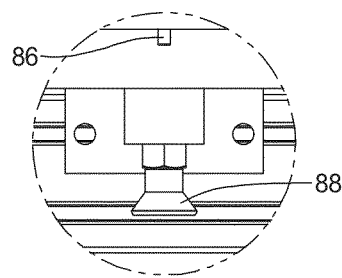
FIG. 6 is an enlarged view of a portion of the positioning table assembly of FIG. 4.
Figure 7:
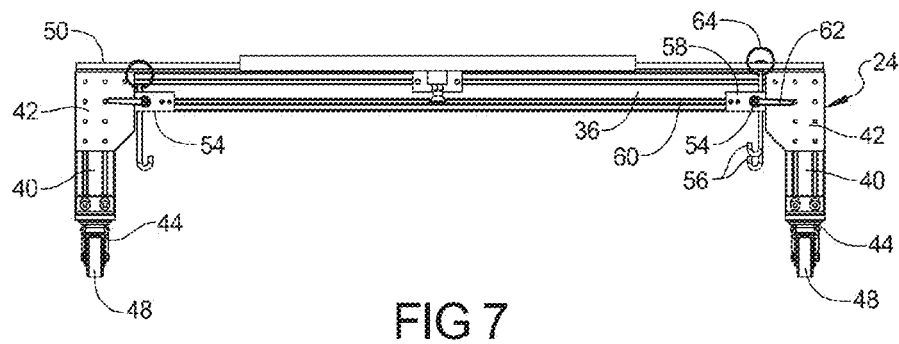
FIG. 7 is a front elevational view of a table bed of the positioning table assembly of FIGS. 3 and 4.
Figure 8:
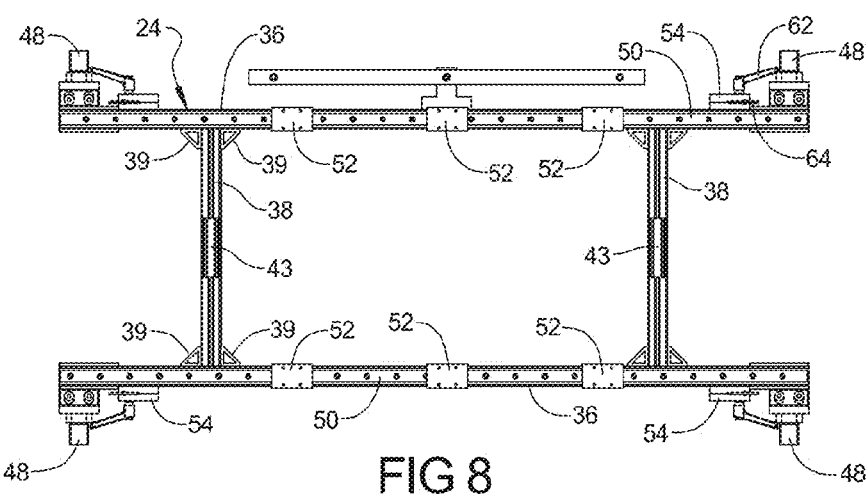
FIG. 8 is a top plan view of a table bed of the positioning table assembly of FIGS. 3 and 4.
Figure 9:
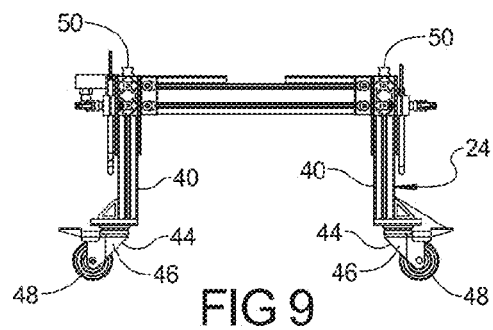
FIG. 9 is a side elevational view of a table bed of the positioning table assembly of FIGS. 3 and 4.
Figure 10:
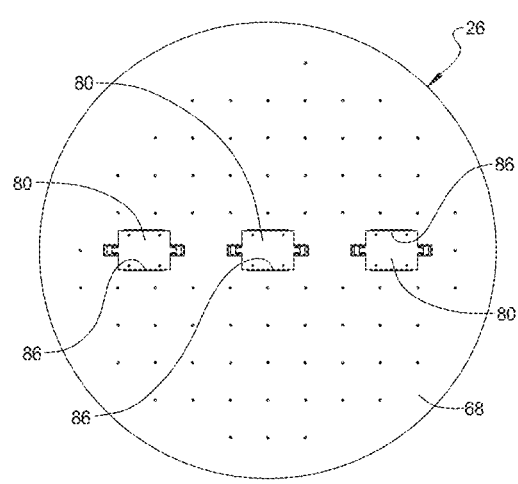
FIG. 10 is a top plan view of a table top of the positioning table assembly of FIGS. 3 and 4.
Figure 11:
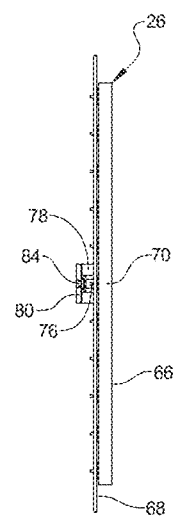
FIG. 11 is a side elevational view of a table top of the positioning table assembly of FIGS. 3 and 4.
Figure 12:
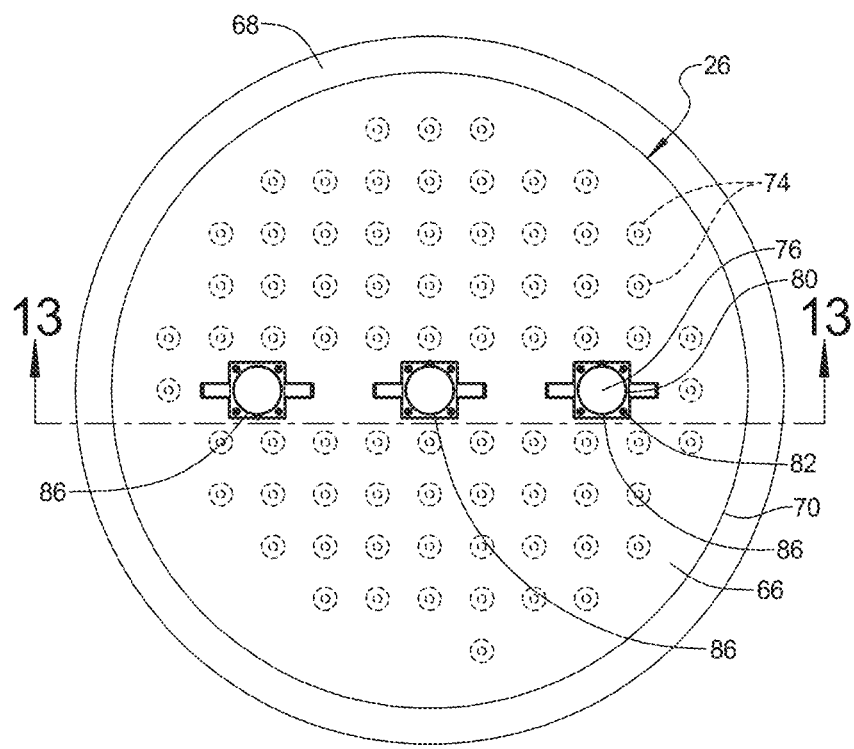
FIG. 12 is a bottom plan view of a table top of the positioning table assembly of FIGS. 3 and 4.
Figure 13:
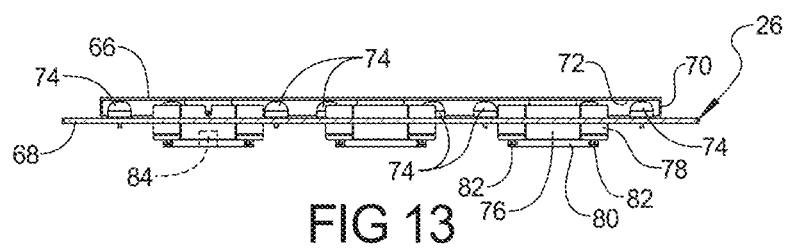
FIG. 13 is a sectional view taken along line 13-13 of FIG. 12.

The positioning table assembly 10 further includes a locating pin 86. The locating pin 86 is of a spring loaded type. The locating pin 86 is connected to one of the bearing carriages 52 to locate the table top 26 relative to the table bed 24. The locating pin 86 includes an indexing plunger 88 that is spring loaded. An operator pulls down on the plunger 88 to release the table top 26. After the table top 26 has moved slightly, the operator releases the plunger 88 and continues to move the table top 26 and the plunger 88 will automatically engage at the next location of the rail 50, right or left, as illustrated in FIG. 6.

Figure 14:
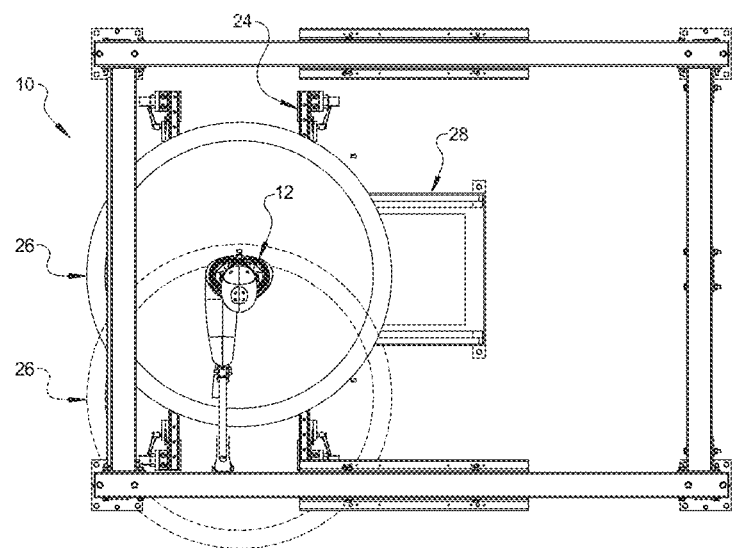
FIG. 14 is a top plan view of the positioning table assembly of FIGS. 3 and 4 illustrating a first operational position and a second operational position.

Referring to FIG. 14, in operation, the table bed 24 is secured to the impact table 28 in the impact stand 29. The table top 26 supports the crash test dummy 12. As illustrated in phantom lines, the table top 26 may be positioned in a first operational position for a left side impact test. As illustrated in solid lines, the table top 26 may be positioned in a second operational position for another impact test. In addition, the top plate 66 may be rotated about the Z axis to position the dummy 12 in yet another operational position.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A positioning table assembly for a crash test dummy comprising:
   a table bed adapted to be attached to an impact table for the crash test dummy;
   a table top adapted to support the crash test dummy and movably attached to said table bed for independent linear movement in X and Y axes and rotationally about a Z axis to position the crash test dummy relative to said table bed; and
   wherein said table bed includes a plurality of rails and a plurality of bearing carriages attached to said table top and movable along said rails to allow said table top to move linearly along said rails and relative to said table bed.

2. A positioning table assembly as set forth in claim 1 wherein said table top includes a bearing plate and a top plate moveable relative to said bearing plate.

3. A positioning table assembly as set forth in claim 2 wherein said table top includes a plurality of ball transfers disposed between said bearing plate and said top plate to allow said top plate to be moved in an X and Y direction and rotate about the Z axis relative to said bearing plate.

4. A positioning table assembly as set forth in claim 2 including a plurality of electromagnets to hold said top plate top securely to said bearing plate when not engaged.

5. A positioning table assembly as set forth in claim 2 wherein said top plate includes a lip extending toward said bearing plate.

6. A positioning table assembly as set forth in claim 1 wherein said table bed includes a frame having a plurality of legs extending downwardly.

7. A positioning table assembly as set forth in claim 6 wherein said table bed includes a plurality of casters connected to said legs to allow said table bed to move along a support surface.

8. A positioning table assembly as set forth in claim 6 including a plurality of clamp assemblies adapted to attach said frame to the impact table.

9. A positioning table assembly as set forth in claim 8 wherein said clamp assemblies are adjustable.

10. A positioning table assembly as set forth in claim 8 wherein each of said clamp assemblies include a hook member being generally "j" shaped.

11. A positioning table assembly for a crash test dummy comprising:
    a table bed adapted to be attached to an impact table for the crash test dummy;
    a table top adapted to support the crash test dummy and movably attached to said table bed for independent movement in X and Y axes and rotationally about a Z axis to position the crash test dummy relative to said table bed;
    said table top including a bearing plate and a top plate moveable relative to said bearing plate;

a plurality of electromagnets to hold said top plate top securely to said bearing plate when not engaged; and a plurality of solenoids surrounding said electromagnets to allow said electromagnets to drop out of the way when the crash test dummy is being positioned.

12. A positioning table assembly for a crash test dummy comprising:

a table bed adapted to be attached to an impact table for the crash test dummy, said table bed including a frame and a plurality of rails extending linearly along said frame;

a plurality of bearing carriages movable along said rails for linear movement along said rails; and a table top having a bearing plate attached to said bearing carriages, a top plate adapted to support the crash test dummy, and a plurality of ball transfers disposed between said top plate and said bearing plate for independent linear movement in X and Y axes and rotationally about a Z axis to position the crash test dummy relative to said table bed.

13. A positioning table assembly as set forth in claim 12 including a plurality of electromagnets to hold said top plate top securely to said bearing plate when not engaged.

14. A positioning table assembly as set forth in claim 12 wherein said top plate includes a lip extending toward said bearing plate.

15. A positioning table assembly as set forth in claim 12 including a plurality of casters connected to said frame to allow said table bed to move along a support surface.

16. A positioning table assembly as set forth in claim 12 including a plurality of clamp assemblies adapted to attach said frame to the impact table.

17. A positioning table assembly as set forth in claim 16 wherein each of said clamp assemblies include a hook member being generally "j" shaped.

18. A positioning table assembly for a crash test dummy comprising:

a table bed adapted to be attached to an impact table for the crash test dummy, said table bed including a frame and a plurality of rails extending linearly along said frame;

a plurality of bearing carriages cooperating with said rails for movement along said rails;

a table top having a bearing plate attached to said bearing carriages, a top plate adapted to support the crash test dummy, and a plurality of ball transfers disposed between said top plate and said bearing plate for independent movement in X and Y axes and rotationally about a Z axis to position the crash test dummy relative to said table bed;

a plurality of electromagnets to hold said top plate top securely to said bearing plate when not engaged; and a plurality of solenoids surrounding said electromagnets to allow said electromagnets to drop out of the way when the crash test dummy is being positioned.

* * * * *